(12) United States Patent
Desmet

(10) Patent No.: US 12,208,671 B2
(45) Date of Patent: Jan. 28, 2025

(54) METHOD AND SYSTEMS FOR POWERTRAIN

(71) Applicant: Dana Automotive Systems Group, LLC, Maumee, OH (US)

(72) Inventor: Frederik Desmet, Maldegem (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 336 days.

(21) Appl. No.: 17/936,111

(22) Filed: Sep. 28, 2022

(65) Prior Publication Data
US 2024/0100935 A1    Mar. 28, 2024

(51) Int. Cl.
*B60K 11/02*      (2006.01)
*B60K 6/22*       (2007.10)

(52) U.S. Cl.
CPC ............... *B60K 11/02* (2013.01); *B60K 6/22* (2013.01)

(58) Field of Classification Search
CPC ..... B60K 11/02; B60K 6/22; B60K 2001/006
USPC ......................................................... 165/287
See application file for complete search history.

(56) References Cited

U.S. PATENT DOCUMENTS

| | | | |
|---|---|---|---|
| 11,035,265 B2 | 6/2021 | Ni | |
| 2012/0118248 A1* | 5/2012 | Mehring | F01P 3/02 123/41.08 |
| 2022/0123629 A1* | 4/2022 | Shao | B60K 11/02 |
| 2022/0220884 A1* | 7/2022 | Honjo | F02D 41/021 |
| 2022/0247281 A1* | 8/2022 | Nihira | H02K 11/33 |

* cited by examiner

Primary Examiner — Steve S Tanenbaum
(74) *Attorney, Agent, or Firm* — McCoy Russell LLP

(57) ABSTRACT

Systems are provided for a differential of an electric powertrain. In one example, a system includes a bypass valve for a multi-coolant system. The bypass valve is configured to bypass a second coolant from an electric motor in response to a temperature of a first coolant.

20 Claims, 3 Drawing Sheets

METHOD AND SYSTEMS FOR POWERTRAIN

TECHNICAL FIELD

The present description relates generally to a hybrid cooling system of a powertrain.

BACKGROUND AND SUMMARY

Drive units may utilize hybrid cooling configurations to meet thermal demands of various components of a powertrain. Hybrid cooling configurations may include two or more types of coolants with different properties. For example, some coolants may be sprayed more efficiently, some may lubricate components, some may absorb a greater amount of waste heat, and the like. A cooling arrangement may be configured to flow only one or two more coolants to various components of the powertrain.

Certain components may experience decreases in efficiency when a corresponding coolant temperature is less than a threshold. If a component is configured to receive hybrid cooling, a temperature increase of the coolants flowing thereto may be reduced relative to a single cooling operation. Thus, while the plurality of coolants in the coolant system may be optimized to match various component temperature performances, it may be desired to block hybrid cooling during certain operations to increase an efficiency of components that demand higher coolant temperatures for enhanced operation.

In one example, the issues described above may be at least partially solved by a method for a hybrid cooling arrangement of an electric drive unit including, in response to a first coolant temperature being less than a threshold temperature, flowing only a first coolant to a motor and bypassing a second coolant away from the motor, wherein the second coolant is different than the first coolant. In this way, the first coolant may warm-up more rapidly and efficiency during cooler temperature may increase.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
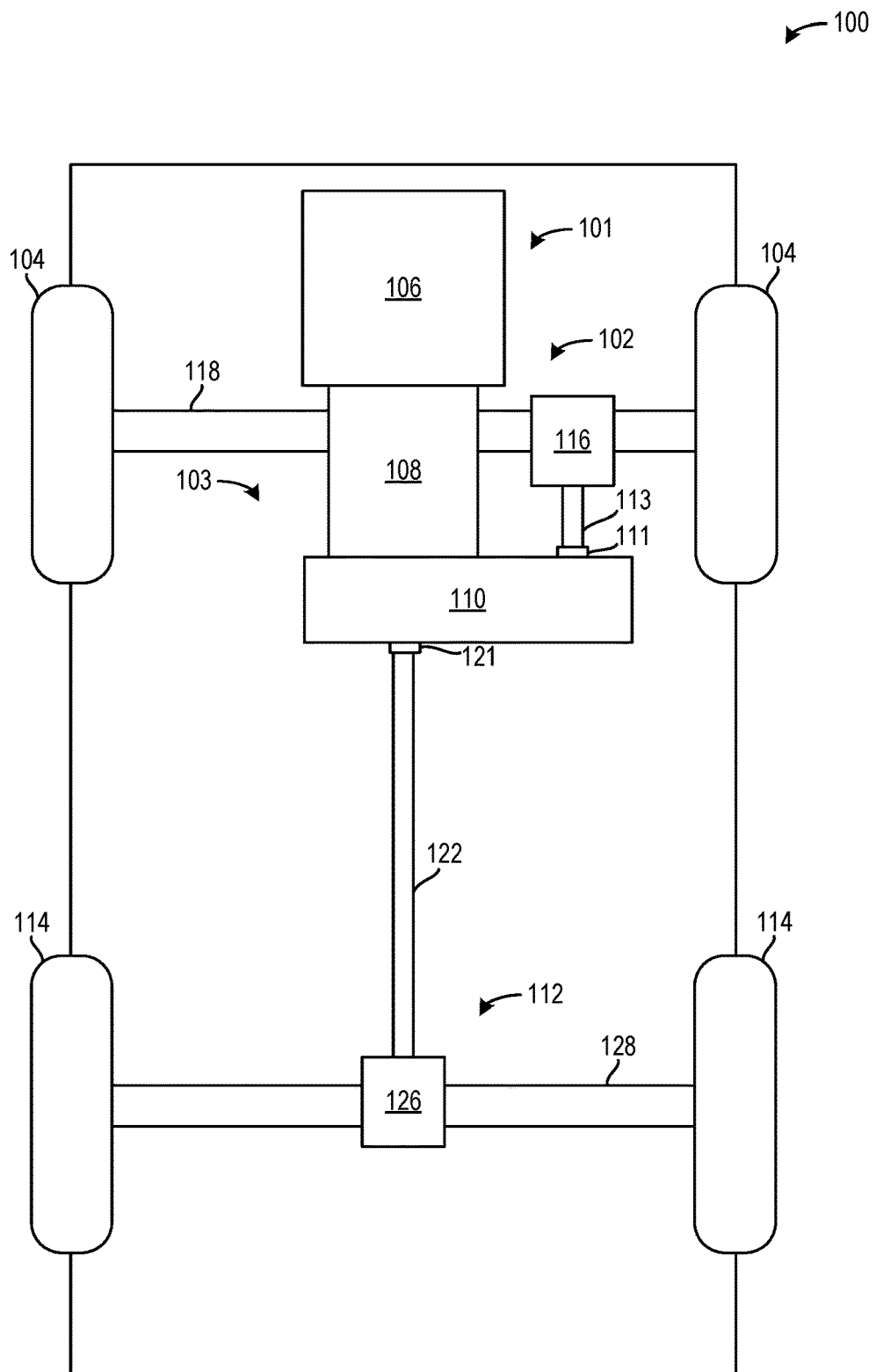
FIG. 1 is a schematic depiction of an example vehicle powertrain, according to an embodiment of the present disclosure.
Figure 2:
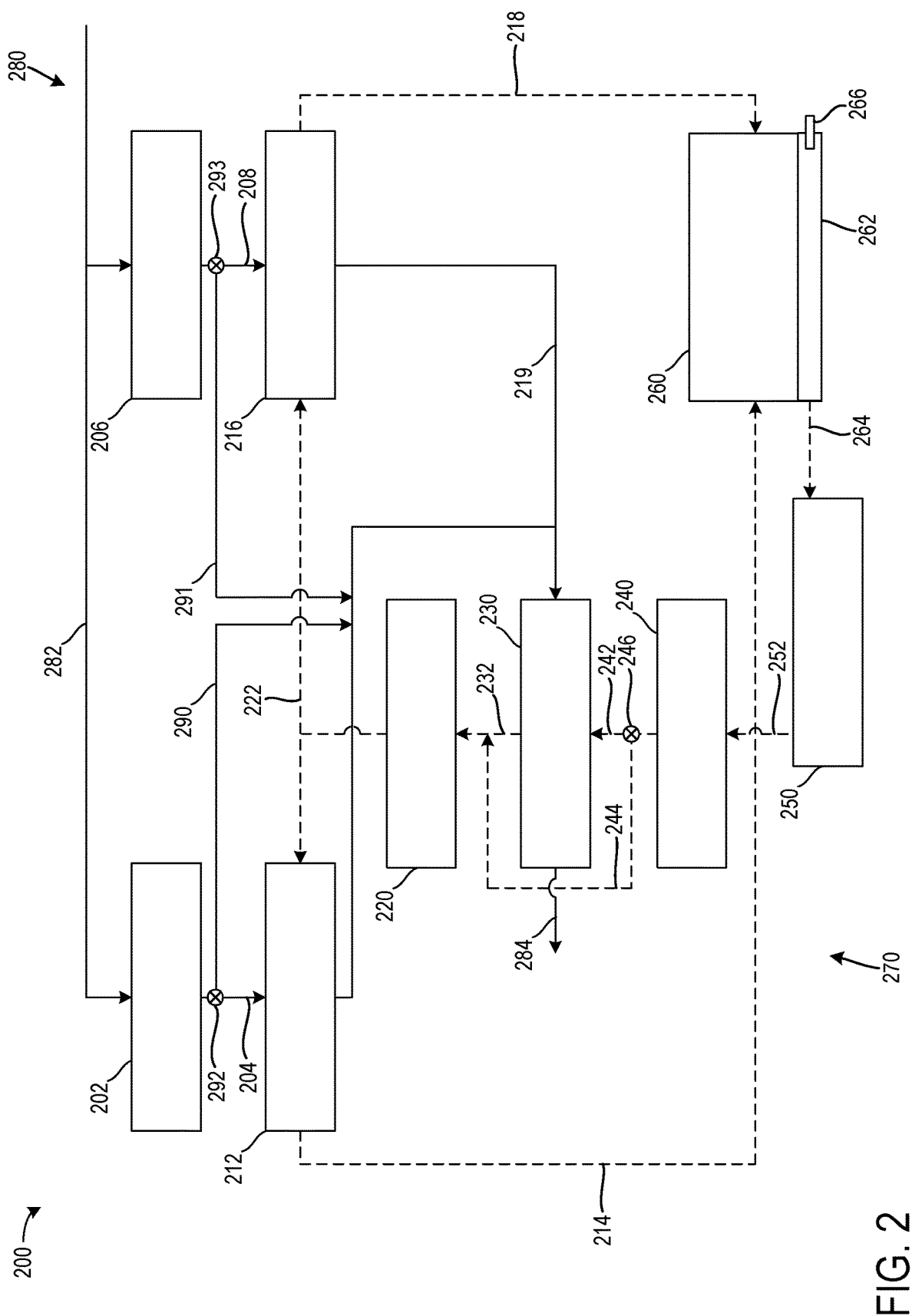
FIG. 2 is an embodiment of a hybrid cooling assembly, according to an embodiment of the present disclosure.
Figure 3:
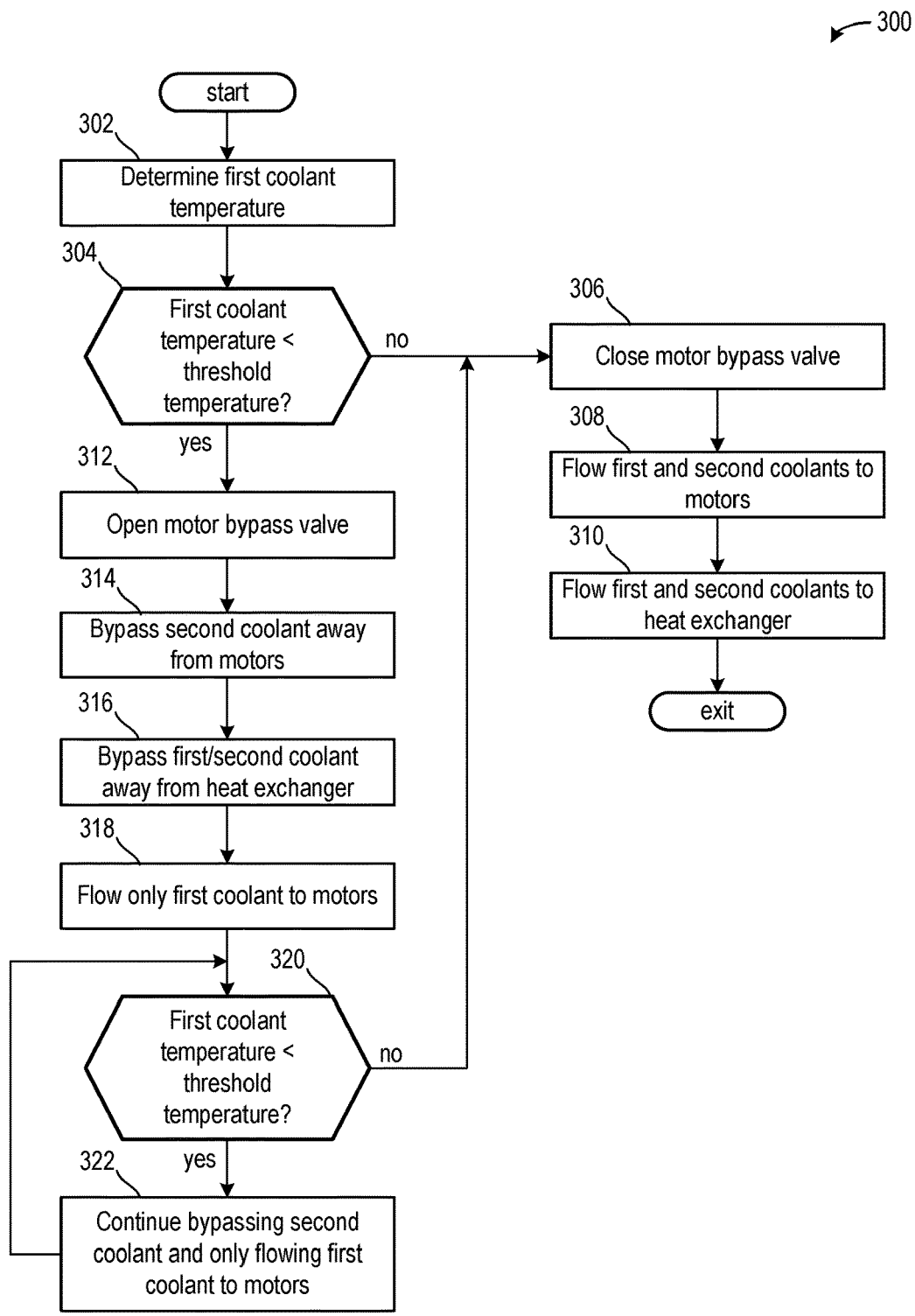
FIG. 3 is a method for controlling a bypass valve of the hybrid cooling assembly, according to an embodiment of the present disclosure.

The following description relates to a system for a hybrid cooling assembly of a drive unit. In one example, the drive unit is an electric drive unit comprising an inverter, electric motor, gearbox, and the like, as shown in FIG. 1. An embodiment of the hybrid cooling assembly is shown in FIG. 2. The hybrid cooling assembly may include a first coolant in a first coolant circuit and a second coolant in a second coolant circuit configured to control a temperature of one or more components of the drive unit individually, or in tandem. The first coolant circuit and the second coolant circuit may be fluidly separated from one another. Components configured to receive hybrid cooling may include separate cooling jackets, chambers, and/or passages for each of the coolants so that the first coolant and the second coolant do not mix. A method for controlling flow of the coolants to the one or more components is shown in FIG. 3

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. In one example, the prime mover 106 is only an electric motor configured to receive electrical energy from a battery or other energy storage device. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

The example of FIG. 1 illustrates a single rotary source (e.g., the prime mover 106) coupled to both a first and a second output (e.g., the first differential 116 and the second differential 126) driving the first and second set of wheels 104, 114, respectively. In some examples, there may be more than one rotary source included in the powertrain 101. An example of a powertrain including two electric motors is shown in FIG. 2.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

Turning now to FIG. 2, it shows a hybrid cooling arrangement 200. The cooling arrangement 200 may include a first coolant circuit 270 and a second coolant circuit 280. The first coolant circuit 270 coolant lines are illustrated via dashed lines. The second coolant circuit 280 coolant lines are illustrated via solid lines. The first coolant circuit 270 may include a first coolant and the second coolant circuit 280 may include a second coolant different than the first coolant. The first coolant may be an oil-based coolant and the second coolant may be a water-based coolant. In one example, the first coolant is oil and the second coolant is water-ethylene-glycol (WEG). It will be appreciated that the embodiment of FIG. 2 and the method of FIG. 3 may be applied to hybrid cooling arrangements utilizing different coolants or different orders of components without departing from the scope of the present disclosure.

The first coolant circuit 270 and the second coolant circuit 280 may be fluidly separated from one another. Components configured to receive hybrid cooling (e.g., receive each of the first coolant and the second coolant) may include separate inlets, outlets, jackets, chambers, conducting elements, and the like for each of the first coolant and the second coolant. By doing this, the first coolant and the second coolant may not mix.

The first coolant circuit 270 may be fluidly coupled to a transmission 260, a sump 262, a first filter 250, a pump 240, a heat exchanger 230, a second filter 220, a first motor 212, and a second motor 216. The first coolant may flow from the sump 262 to the first filter 250 via a sump passage 264. In one example, the first filter 250 is a suction filter. The first coolant may flow from the first filter 250 to the pump 240 via a first filter passage 252. In one example, the pump 240 is an electric pump powered via an energy storage device. The first coolant may be expelled from the pump 240 into a pump outlet passage 242. The pump outlet passage 242 may include a first coolant bypass valve 246 configured to control the flow of the first coolant to the heat exchanger 230 and to the heat exchanger bypass 244. The first coolant bypass valve 246 may be adjusted in response to one or more of a first coolant temperature and an ambient temperature, which may be determined directly via a temperature sensor or based on a temperature of the transmission 260. The temperature sensor may be positioned in the sump 262 (e.g., temperature sensor 266). The first coolant exiting the heat exchanger 230 and/or the heat exchanger bypass 244 may flow into a first heat exchanger outlet passage 232. The first heat exchanger outlet passage 232 may be fluidly coupled to the second filter 220. A second filter passage 222 may direct the first coolant from the second filter 220 to the first motor 212 and the second motor 216. In the example of FIG. 2, the first coolant flows to each of the first motor 212 and the second motor 216 without input from a valve or other flow control device. In some examples, the second filter passage 222 may include a valve configured to control coolant flow to each of the first motor 212 and the second motor 216 such that the motors may receive different amounts of the first coolant. The first motor 212 may return the first coolant to the transmission 260 via a first motor return passage 214. The second motor 216 may return the first coolant to the transmission 260 via a second motor return passage 218.

The second coolant circuit 280 may be fluidly coupled to a first inverter 202, a second inverter 206, the first motor 212, the second motor 216, and the heat exchanger 230. The second coolant circuit 280 may direct the second coolant to the first inverter 202 and the second inverter 206 via a second coolant circuit feed passage 282. The first inverter 202 may flow the second coolant to the first motor 212 via a first inverter outlet passage 204. The second inverter 206 may flow the second coolant to the second motor 216 via a second inverter outlet passage 208. The first motor 212 and the second motor 216 may direct the second coolant to the heat exchanger 230 via a combined motor outlet passage 219. The heat exchanger 230 may expel the second coolant to a remainder of the second coolant circuit 280 via a second heat exchanger outlet passage 284. The second heat exchanger outlet passage 284 may be fluidly coupled to a sump, a pump, or other component of the second coolant circuit 280.

The second coolant circuit 280 may include a second bypass passage and a second bypass valve. More specifically, the second coolant circuit 280 may further include a first motor bypass passage 290 and a first motor bypass valve 292. The first motor bypass 290 may be configured to route the second coolant away from the first motor 212. The second coolant circuit 280 may further include a second motor bypass passage 291 and a second motor bypass valve 293. The second motor bypass 291 may be configured to route the second coolant away from the second motor. In the example of FIG. 2, the first motor bypass 290 and the second motor bypass 291 may direct the second coolant from the first inverter outlet passage 204 and the second inverter outlet passage 208, respectively, to the heat exchanger 230. Additionally or alternatively, the first motor bypass 290 and the second motor bypass 291 may direct the second coolant out of the hybrid cooling arrangement 200 of the electric drive unit. Thus, the second coolant may also bypass the heat exchanger 246, thereby allowing omission of the heat exchanger bypass valve, which may decrease a manufacturing cost and complexity.

The first and second motor bypass valves 292, 293 may comprise an open position and a closed position. The first and second motor bypass valves 292, 293 may be electrically actuated via commands from a controller to the open position or the closed position. The open position may open the first motor bypass passage 290 and the second motor bypass passage 291 to allow the second coolant to bypass the motors and flow to the heat exchanger 230 or directly to the second heat exchanger outlet passage 284 in some examples. The closed position may seal the first and second motor bypass passages 290, 291 and force the second coolant to flow to the first motor 212 and the second motor 216. When the first and second motor bypass valves 292, 293 are open, a single cooling operation of the motors may be executed, wherein only the first coolant flows thereto. When the first and second motor bypass valves 292, 293 are closed, a hybrid cooling operation of the motors may be executed, wherein both the first coolant and the second coolant flow to the motors. The first coolant may be sprayed onto end windings of the motors and the second coolant may flow around a stator, windings, and to a shaft of the motors, wherein the first coolant and the second coolant do not mix with one another within or outside of the motors. As such, the first motor 212 and the second motor 216 may be electric motors in one example.

In some examples, the first and second motor bypass valves may be combined into a single second coolant bypass valve configured to bypass each of the first motor 212 and the second motor 216. As such, the first and second motor bypass passages 290, 291 may be combined into a single passage.

In some examples, additionally or alternatively, the first coolant bypass valve 246 and the heat exchanger bypass 244 may be omitted. In such an example, the first and second motor bypass passages 290, 291 and the first and second motor bypass valves 292, 293 may be further configured to bypass the second coolant away from the heat exchanger 230 when the motor bypass valves 292, 293 are open. That is to say, the second coolant may be bypassed away from the first motor 212, the second motor 216, and the heat exchanger 230 in response to one or more conditions. In one example, it may be desired to executed a single cooling operation in response to one or more of an ambient temperature, a first coolant temperature, or a second coolant temperature. For example, if the first coolant temperature is less than a threshold temperature, then drag within the transmission 260 may be greater than a desired amount and efficiency may be reduced. As such, it may be desired for the first coolant to absorb all the waste heat from the electric motors until its temperature is greater than or equal to the threshold temperature.

In some examples, additionally or alternatively, if the first coolant temperature is less than the threshold temperature and the second coolant temperature is greater than the threshold temperature, then hybrid cooling may be desired due to the second coolant being able to heat the first coolant or absorbing less waste heat from the motors.

In other examples, additionally or alternatively, an order of components along the second coolant circuit 280 may be adjusted without departing from the scope of the present disclosure. For example, the heat exchanger 230 may be arranged upstream of the first motor 212 and the second motor 216 relative to a direction of second coolant flow. In such an example, the first and second motor bypass passages 290, 291 and the first and second motor bypass valves 292, 293 may be positioned downstream of the heat exchanger 230 if the first coolant bypass valve 246 and the heat exchanger bypass 244 are included in the cooling arrangement 200. Additionally or alternatively, if the heat exchanger bypass 244 and the first coolant bypass valve 246 are not included, then the first and second motor bypass valves 292, 293 may be positioned upstream of the heat exchanger 230. It should be appreciated that if coolant is not shown flowing at a location or between elements in FIG. 2, then in at least one example there is no coolant flowing at the location or between the elements.

In this way, the cooling arrangement of FIG. 2 illustrates a system for bypassing a second coolant away from hybrid cooled devices configured to receive hybrid cooling in response to conditions. The hybrid cooled devices may include the plurality of motors and the heat exchanger, each of which is configured to receive the first coolant and the second coolant. Conditions may include one or more of an ambient temperature, a first coolant temperature, and a second coolant temperature. The technical effect of bypassing the second coolant is to allow the first coolant to warm up more quickly, which may reduce drag losses in the transmission. The coolant circuits are fluidly sealed from one another such that mixing or contact between the first and second coolants does not occur.

Turning now to FIG. 3, it shows a method 300 for adjusting a first coolant and/or a second coolant flow. Instructions for carrying out method 300 may be executed by a controller based on instructions stored on a memory of the controller and in conjunction with signals received from sensors of the powertrain system, such as the sensors described above with reference to FIG. 1. The controller may employ actuators of the electric drive unit to adjust cooling operation, according to the method described below.

The method 300 begins at 302, which includes determining a first coolant temperature. The first coolant temperature may be directly determined via a temperature sensor arranged along a first coolant circuit (e.g., temperature sensor 266 of FIG. 2). Additionally or alternatively, the first coolant temperature may be inferred via a temperature of the first motor or the second motor, a transmission temperature, or a combination of ambient temperature, drive cycle duration, load, and the like.

At 304, the method 300 may include determining if the first coolant temperature is less than a threshold temperature. The threshold temperature may be based on a temperature of the first coolant at which drag losses in the transmission are below a desired value. If the first coolant temperature is not less than (e.g., greater than or equal to) the threshold temperature, then at 306, the method 300 may include closing the motor bypass valve. As such, the motor bypass may be sealed and the second coolant may be blocked from flowing therethrough. In some examples, additionally or alternatively, if the second coolant temperature is greater than the threshold temperature, then hybrid cooling may be desired and the method 300 may proceed to 306 even if the first coolant temperature is less than the threshold temperature.

At 308, the method 300 may include flowing the first and second coolants to the first and second motors. As such, hybrid cooling may be provided to the first and second motors and a power density thereof may be increased relative to a single cooling operation.

At 310, the method 300 may include flowing the first and second coolants to the heat exchanger. A first coolant bypass valve may be closed and the first coolant forced to flow to the heat exchanger.

Returning to 304, if the first coolant temperature is less than the threshold temperature, then at 312, the method 300 may include opening the motor bypass valve. As such, the motor bypass may be open and fluidly coupled to outlets of the inverters.

At 314, the method 300 may include bypassing the second coolant away from the motors. In one example, the second coolant may be directed to the heat exchanger or to a second coolant heat exchanger outlet.

At 316, the method 300 may include bypassing the first or second coolant away from the heat exchanger. For example, if the first coolant bypass valve is present in the cooling arrangement, the first coolant is bypassed away from the heat exchanger, then the second coolant may flow to the heat exchanger. As another example, the first and second motor bypass valves may bypass the second coolant away from the motors and the heat exchanger such that the first coolant bypass valve may be omitted, which may decrease a manufacturing cost and complexity of the cooling arrangement.

At 318, the method 300 may include flowing only the first coolant to the first and second motors. The first coolant may be sprayed at end windings of the motors, which may increase a temperature of the first coolant. Furthermore, the first coolant may absorb a greater amount of the waste heat from the motors due to the absence of the second coolant, resulting in a faster heating of the first coolant relative to a hybrid cooling operation.

At 320, the method 300 may include determining if the first coolant temperature is less than the threshold temperature, similar to 304. If the first coolant temperature is still less than the threshold temperature, then at 322, the method 300 may include continuing to bypass the second coolant away from the motors and flowing only the first coolant to the motors. If the first coolant temperature is no longer less than the threshold temperature, then the method 300 proceeds to 306-310 as described above. Hybrid cooling operation of the motors may be initiated.

The disclosure provides support for a method for a hybrid cooling arrangement of an electric drive unit including in response to a first coolant temperature being less than a threshold temperature, flowing only a first coolant to an electric motor and bypassing a second coolant away from the electric motor, wherein the second coolant is different than the first coolant. A first example of the method further includes where bypassing the second coolant away from the electric motor comprises adjusting a position of a bypass valve arranged in a bypass passage. A second example of the method, optionally including the first example, further includes where the bypass passage is fluidly coupled to a heat exchanger. A third example of the method, optionally including one or more previous examples, further includes where the bypass passage is further configured to bypass the second coolant away from a heat exchanger. A fourth example of the method, optionally including one or more previous examples, further includes where flowing the first coolant and the second coolant to the electric motor in response to the first coolant temperature being greater than or equal to the threshold temperature. A fifth example of the method, optionally including one or more previous examples, further includes where the electric motor is a first electric motor, the hybrid cooling arrangement further comprising a second electric motor, and wherein only the first coolant is directed to the first electric motor and the second electric motor in response to the first coolant temperature being less than the threshold temperature.

The disclosure further provides support for a system including a first coolant circuit fluidly coupled to a transmission, a filter, a heat exchanger, a plurality of motors, and a heat exchanger, a second coolant circuit fluidly coupled to a plurality of inverters, the plurality of motors, and the heat exchanger, wherein the second coolant circuit further comprises a second coolant bypass valve configured to bypass a second coolant away from the plurality of motors, and a controller comprising computer-readable instructions stored on non-transitory memory thereof that when executed enable the controller to adjust the second coolant bypass valve to an open position in response to a temperature of a first coolant of the first coolant circuit being less than a threshold temperature, and flow only the first coolant to the plurality of motors. A first example of the system further includes where the instructions further enable the controller to adjust the second coolant bypass valve to a closed position and flow the first coolant and the second coolant to the plurality of motors in response to the temperature of the first coolant being greater than or equal to the threshold temperature. A second example of the system, optionally including the first example, further includes where the second coolant bypass valve is further configured to bypass the second coolant away from the heat exchanger. A third example of the system, optionally including one or more of the previous examples, further includes where the first coolant circuit further comprises a first coolant bypass valve configured to bypass the first coolant away from the heat exchanger. A fourth example of the system, optionally including one or more of the previous examples, further includes where the instructions further enable the controller to adjust the first coolant bypass valve to an open position in response to the temperature of the first coolant being less than the threshold temperature to bypass the heat exchanger. A fifth example of the system, optionally including one or more of the previous examples, further includes where the first coolant and the second coolant do not mix in the plurality of motors and the heat exchanger, and wherein the first coolant is oil and the second coolant is water ethylene glycol (WEG). A sixth example of the system, optionally including one or more of the previous examples, further includes where the heat exchanger is arranged upstream of the plurality of motors relative to a direction of second coolant flow. A seventh example of the system, optionally including one or more of the previous examples, further includes where the first coolant circuit is fluidly separated from the second coolant circuit. An eighth example of the system, optionally including one or more of the previous examples, further includes where the second coolant bypass valve is two valves, a first motor bypass valve arranged in a first motor bypass passage and a second motor bypass valve arranged in a second motor bypass passage.

The disclosure provides additional support for a method for a cooling system of an electric drive unit including flowing only a first coolant to hybrid cooled devices of the cooling system in response to a first coolant temperature being less than a threshold temperature, and flowing both the first coolant and a second coolant to hybrid cooled devices of the cooling system in response to the first coolant temperature being greater than or equal to the threshold temperature. A first example of the method further includes where flowing only the first coolant to hybrid cooled devices comprises opening a second coolant bypass valve to bypass the second coolant away from hybrid cooled devices. A second example of the method, optionally including the first example, further includes where hybrid cooled devices comprise one or more of a plurality of electric motors and a heat exchanger. A third example of the method, optionally including one or more of the previous examples, further includes where the first coolant flows through a first coolant circuit and the second coolant flows through a second coolant circuit, and wherein the first coolant does not mix with the second coolant in hybrid cooled devices. A fourth example of the method, optionally including one or more of the previous examples, further includes where flowing the first coolant to a transmission, and wherein the transmission is sealed from a second coolant circuit.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid cooling arrangement of an electric drive unit, comprising:
   in response to a first coolant temperature being less than a threshold temperature, flowing only a first coolant to an electric motor and bypassing a second coolant away from the electric motor, wherein the second coolant is different than the first coolant.

2. The method of claim 1, wherein bypassing the second coolant away from the electric motor comprises adjusting a position of a bypass valve arranged in a bypass passage.

3. The method of claim 2, wherein the bypass passage is fluidly coupled to a heat exchanger.

4. The method of claim 2, wherein the bypass passage is further configured to bypass the second coolant away from a heat exchanger.

5. The method of claim 1, further comprising flowing the first coolant and the second coolant to the electric motor in response to the first coolant temperature being greater than or equal to the threshold temperature.

6. The method of claim 1, wherein the electric motor is a first electric motor, the hybrid cooling arrangement further comprising a second electric motor, and wherein only the first coolant is directed to the first electric motor and the second electric motor in response to the first coolant temperature being less than the threshold temperature.

7. A system, comprising:
   a first coolant circuit fluidly coupled to a transmission, a filter, a heat exchanger, a plurality of motors, and a heat exchanger;
   a second coolant circuit fluidly coupled to a plurality of inverters, the plurality of motors, and the heat exchanger, wherein the second coolant circuit further comprises a second coolant bypass valve configured to bypass a second coolant away from the plurality of motors; and
   a controller comprising computer-readable instructions stored on non-transitory memory thereof that when executed enable the controller to:
   adjust the second coolant bypass valve to an open position in response to a temperature of a first coolant of the first coolant circuit being less than a threshold temperature; and
   flow only the first coolant to the plurality of motors.

8. The system of claim 7, wherein the instructions further enable the controller to adjust the second coolant bypass valve to a closed position and flow the first coolant and the second coolant to the plurality of motors in response to the temperature of the first coolant being greater than or equal to the threshold temperature.

9. The system of claim 7, wherein the second coolant bypass valve is further configured to bypass the second coolant away from the heat exchanger.

10. The system of claim 7, wherein the first coolant circuit further comprises a first coolant bypass valve configured to bypass the first coolant away from the heat exchanger.

11. The system of claim 10, wherein the instructions further enable the controller to adjust the first coolant bypass valve to an open position in response to the temperature of the first coolant being less than the threshold temperature to bypass the heat exchanger.

12. The system of claim 7, wherein the first coolant and the second coolant do not mix in the plurality of motors and the heat exchanger, and wherein the first coolant is oil and the second coolant is water ethylene glycol (WEG).

13. The system of claim 7, wherein the heat exchanger is arranged upstream of the plurality of motors relative to a direction of second coolant flow.

14. The system of claim 7, wherein the first coolant circuit is fluidly separated from the second coolant circuit.

15. The system of claim 7, wherein the second coolant bypass valve is two valves, a first motor bypass valve arranged in a first motor bypass passage and a second motor bypass valve arranged in a second motor bypass passage.

16. A method for a cooling system of an electric drive unit, comprising:
  flowing only a first coolant to hybrid cooled devices of the cooling system in response to a first coolant temperature being less than a threshold temperature; and
  flowing both the first coolant and a second coolant to hybrid cooled devices of the cooling system in response to the first coolant temperature being greater than or equal to the threshold temperature.

17. The method of claim 16, wherein flowing only the first coolant to hybrid cooled devices comprises opening a second coolant bypass valve to bypass the second coolant away from hybrid cooled devices.

18. The method of claim 16, wherein hybrid cooled devices comprise one or more of a plurality of electric motors and a heat exchanger.

19. The method of claim 16, wherein the first coolant flows through a first coolant circuit and the second coolant flows through a second coolant circuit, and wherein the first coolant does not mix with the second coolant in hybrid cooled devices.

20. The method of claim 16, further comprising flowing the first coolant to a transmission, and wherein the transmission is sealed from a second coolant circuit.

* * * * *